Patented June 6, 1939

2,160,869

UNITED STATES PATENT OFFICE 2,160,869

COMPOSITION OF MATTER

Mone R. Isaacs, Chelsea, N. J.

No Drawing. Application September 1, 1933, Serial No. 687,819

9 Claims. (Cl. 106—38)

This invention relates to a composition of matter, or a compound in which is combined or incorporated a protein, such as casein, and/or a carbohydrate, such as dextrine, and a pitch or gummy substance, such as an oleo-resin, and preferably Canada balsam, and/or a similar pitch obtained from Oregon fir trees.

One object of the present invention is to produce a composition of matter, containing the materials above referred to, together with other ingredients, to produce compositions of matter having differing consistencies, particularly as to fluidity and plasticity, which are useful in a wide field in the various arts, particularly where a material which is resistant to water and which has strong adhesive properties is desired.

A further object of my invention is to combine the protein (or carbohydrate) with the balsam, or other oleo-resin, in so intimate a manner that the resulting composition has new and desirable properties not incident or pertinent to the ingredients by themselves, and which is particularly adapted to the making of coating compositions, sizes, binders, glues or adhesives, insulators, paints, varnishes, gaskets, and various other similar or analogous uses.

Further objects of my invention will appear in the specification and claims below.

One simple way of producing a composition of matter embodying my invention and having the characteristics above referred to, is by adding to dry powdered or granular casein or dextrine, or other protein or hydrocarbon, which, when dissolved in water forms a colloidal paste, glue or adhesive mass, a relatively small quantity of balsam, preferably Canada balsam, although the pitch from the Oregon fir tree is eminently adapted for my composition or, for that matter, any other suitable and similar oleo-resin may be used. This balsam is preferably thinned or cut back with a suitable solvent therefor such as a light mineral oil, gasoline or isopropyl alcohol and is mixed with the casein thoroughly to distribute the balsam and its solvent (such as gasoline or isopropyl alcohol) uniformly over the surfaces of the dry particles of casein.

To this mixture I then add and thoroughly stir in a relatively small quantity of lime or other suitable alkali, which, when mixed with casein, renders the casein easily soluble in water. Lime so used may be either quick or slaked. Other dry alkalies, such as borax or soda ash, or sodium triphosphate may be used to replace all or some of the lime in the preparation of my improved composition of matter.

When lime is used, I preferably add therewith a relatively small quantity of a water soluble fluoride, such as sodium fluoride, and when these ingredients are thoroughly mixed or commingled, the resulting product is a loose, dry, granular mass which, when water is added thereto, readily forms, under a stirring operation, a smooth, homogeneous, relatively stable compound, suitable for use as a paste, plastic glue, size or adhesive, dependent, of course, upon the quantity of water which is added thereto.

But the dry composition, prior to the adding of water thereto, is very stable. It may be kept without substantial deterioration for indefinite periods, so long as it is kept dry, and out of contact with water or moisture, and when it is desired to use it, one merely adds to it the requisite or necessary quantity of water and thoroughly agitates or stirs the mass until it is of uniform consistency.

As above stated, the quantity of water thus to be added to the mixture depends very much upon the use to which the product is to be put. If to be used for the production of a paint for surfacing objects, enough water should be added to bring the mixture to the consistency of a paint; if to be used for a cement or a glue, manifestly less water would be added; if to be used as a plastic out of which is to be molded various objects, even less water is used so that the resulting mass would be a homogeneous plastic, as distinguished from a fluid; if to be used for sizing fabrics, enough water should be added to bring the consistency of the resulting composition to that ordinarily found in sizing compositions.

The proportion of ingredients suitable for the production of the composition of matter above described, is as follows, it being understood, however, that the proportions stated below are typical and do not require to be strictly adhered to, but may be varied dependent upon the use to which the resulting composition is to be put:

| | | |
|---|---|---|
| Casein, substantially | pounds | 100 |
| Oleo-resin | quarts | ¾ to 4 |
| Gasoline | do | ½ to 4 |
| Lime | pounds | 6 to 20 |
| Sodium fluoride | do | 1 to 5 or more |

While the above is generally the basis of my new composition of matter, I may incorporate therewith other ingredients, depending upon the purposes to which the composition is to be put, and to insure the stability of the composition prior to the admixture of water thereto.

It is well recognized in the art that lime, admixed with casein, performs the function of rendering the casein soluble in water. The presence of the moisture in the atmosphere, and to which the mixture might be exposed, operates to quickly produce a reaction between the lime and the casein when they are admixed. Where, therefore, the mixture is to be likely or liable to be subjected to moisture, such as atmospheric moisture, before it is finally admixed with water for use, the small quantity of the light oil with which the balsam is thinned or cut back, together with the balsam, appear to form a water resistant film on the particles and to retard such reaction.

Instead of gasoline, a sulphonated oil, such as Turkey red oil or isopropyl alcohol, or any other suitable solvent which will cut back or thin the balsam, may be substituted. The gasoline and other light oil, and the isopropyl alcohol also tend to prevent the casein from reacting with whatever moisture it may be subjected, and they tend to soften and make pliable the final composition.

In the making of lacquers, varnishes, coatings on fabrics, paints and plastic compositions, it is often desirable to add to the composition above described, a small quantity of a softener, such as a light mineral oil or a sulphonated oil, or a soap (preferably a neutral soap in granular form) the quantity being variable and dependent upon the particular use to which the composition is to be put. The quantity of the softener, so added, may be stated generally to be from one pint to one quart, when the quantity of casein is substantially 100 pounds as stated in the formula above given.

When applied as a liquid, as for instance, as a size, or a surface coating, as a paint or varnish, or as an adhesive, for cementing together plies of plywood in veneers or plies of fabric or paper, or plies of wood and metal, or as a surface dressing, for instance as a dressing for leather, the composition, after application quickly loses its water content by evaporation, leaving a layer or film of paint or varnish, adhesive or dressing which is very flexible or elastic and is highly water repellent.

The balsam or other oleo-resin so united with the casein and other ingredients produces in the composition markedly rubbery properties, particularly as relates to its water resistance, its feel, its flexibility, and its resistance to cracking when flexed, and the surface of the film, when applied as a varnish and containing the softening oils, is bright and smooth, the composition being admirably adapted as a varnish or lacquer.

When used as a cement or glue the glossy appearance of the surface of the composition is not so material, but the rubbery water-repellent properties are highly desirable. The composition is admirably adapted for adhesively securing sheets or plies of metal to wood, or other materials, thus making the composition particularly useful in the making of light structures reinforced with metal, as in the construction of aeroplanes, wherein water resistance is a desirable quality.

Moreover, the balsam, or other suitable oleoresin substantially preserves the organic compounds from decomposition, both before and after the water has been added thereto; this is a highly desirable result which will be recognized at once by those familiar with casein compositions.

The balsam that appears to be best adapted to my purposes is Canadian balsam which is the natural turpentine of the abies balsamea—a conifer—which grows in Canada and northern parts of the United States. The balsam or turpentine from the Oregon fir tree is also adapted for my purposes.

These balsams are true turpentines; they are terpene balsams and they are true oleo resins. They are terpene oleo resins. The use of other similar soft or semiliquid natural turpentines or terpene oleo resins are also within the scope and purview of my invention.

In the making of opaque and colored paints, incorporating my improved basic composition above described, suitable fillers may be added to produce, when water is added, a surface coating composition having the characteristics of water paints, but the quantities of fillers and pigments admixed with the basic composition will obviously vary considerably, dependent upon the surface to be covered; the kind of weather or other conditions to which it is subjected; and the final appearance desired. The addition of these further ingredients for the purposes above made plain should follow that ordinarily employed in the mixing of paints for any particular purpose.

As above referred to, the composition of matter above described may be made by adding a relatively small quantity of water thereto, to result in the production of a plastic mass capable of being molded in various shapes and forms. When so molded and hardened, by the evaporation of the water therefrom, the resulting composition has pronounced dielectric properties and therefore may be used for insulating purposes or for any purposes for which molded objects are produced, the requirements of which are that they may be easily molded, that the molded article becomes hard and remains permanent over long periods of time. In the making of a plastic material, suitable filling materials in powdered condition may be added to my composition to bring the mass to the desired state of plasticity and to make the same readily moldable. Such fillers may be clay, asbestine, whiting and similar materials.

While I have described the making of the composition comprising my invention as being performed without the admixture thereto of water during the mixing of the other ingredients, it is obvious that the addition of the water substantially concludes or completes the method or process of making the final composition, and that the water may be added at the place where the dry mixture, without water, is shipped for use. But the water may be added during the original compounding of the mixture. Where, therefore, the cost of the transportation of the water, necessary to the completion of the compound, is of no material importance, then the water may be added during the compounding of the ingredients. The sodium fluoride is operative to prevent the casein, after it has once been dissolved with lime, in the water, from being converted into a composition which separates out of and is insoluble in water. In other words, casein, after having been dissolved in water, with lime for the alkali, tends to change into an insoluble gummy mass, and the sodium fluoride greatly retards and substantially arrests that conversion or reaction, thus maintaining the casein in solution in water over long periods of time, and practically until the composition is applied or spread in use and the water thus has an opportunity of evaporating therefrom.

When, however, some other alkali than lime is employed with the casein, the tendency of the casein to form a gummy soluble mass is not markedly present, with the result that the soluble fluoride may be omitted.

It is to be understood that the proteins and the carbohydrates which are capable of incorporation into my new and useful composition, operate similarly, although in varying degrees. The carbohydrates, such as dextrine, starch, tapioca, tapioca meal and similar materials, may be used to a considerable extent, as a substitute, in whole, or in part, for the casein, soya bean meal or other protein in my composition. I have, therefore, adopted and used in this specification and claims expressions like or similar to "the ordinary powdered or granular organic compounds, which, when dry, and admixed with or dissolved in water, form a colloidal paste, glue or adhesive mass" to define the ingredient of my composition, which may be proteinaceous or carbohydrous, or a mixture of proteins and carbohydrates. It is believed that this expression is accurately definite of the distinctive properties of the main colloidal ingredients forming an essential of my improved composition.

When in the practice of my invention, a carbohydrate such as dextrine or similar material, is employed in lieu of casein, the addition to or incorporation into the mixture of the soluble fluoride is not always necessary, for the dextrine or similar carbohydrate does not appear to substantially change back into a gummy mass, insoluble in water, after once having been dissolved in water. When, therefore, such carbohydrate is used, for instance, to replace or as a substitute for a part of the casein or other protein, the quantity of fluoride added may be correspondingly reduced to an amount sufficient to react with the quantity of casein actually present in the mixture or composition.

From the above it will now be apparent that I have provided a composition which may be easily made as a dry powdered substance, suitable to be used as an adhesive, glue or sizing by the mere addition thereto of water, with agitation, to reduce the mass to a fluid or semi-fluid condition dependent upon whether the product is to be used strictly as an adhesive or as a sizing or coating composition. It is, however, obvious that the water may be added at the place where the mixture is originally compounded and it may be so mixed or compounded as to be adapted for the particular use intended, that is to say, as a paste or a glue, or a size for various fabrics, the amount of water being added being sufficient to reduce the mass to the desired state of fluidity. It is also to be noted that the composition is perfectly adapted to form the base of various other compositions; thus, to it may be admixed pigments, fillers and the like in order to produce, with the use thereof, suitable paints and surface dressings for walls and the like, and this pant or coating composition may be applied in the usual ways as, for instance, by the use of a brush, knife, or a spraying apparatus.

The composition is also eminently adapted for use as a varnish or lacquer, by the mere addition thereto of suitable ingredients, particularly of softening oils, the quantity of such ingredients being fully within the purview of this invention, and may be practiced by any one skilled in the art in the usual manner of preparing lacquers and varnishes for the purposes intended.

It is also apparent that by adding various filler ingredients, such as clays, bentonite, asbestos, magnesia, sawdust, cork, inert minerals, such as mica flakes, mineral wool, earths, and the like, the composition forming the subject-matter of this invention may be advantageously used in the production of plastic compositions capable of being molded and/or pressed into various desired forms, for the composition, once molded and allowed to harden or set, is eminently adapted for the production of many of the ordinary objects usually made of plastic material molded to the desired form. The composition is thus capable of being used as above intimated for the purpose of making insulating compositions and sheet compositions suitable for floor coverings, wall board and the like, the desired flexibility in the finished product being obtained, when desirable, by the addition thereto of a sufficient amount of a softener to produce the desired flexibility.

When used without modification, except as to the addition of water thereto, the composition is eminently adapted as an adhesive, and is particularly useful in permanently uniting together plies, layers and laminae of various materials. The adhesive properties of this composition are particularly high, making the adhesive desirable for use in ply work, such as is used in aeroplane construction and for sizing the fabrics used therein.

This adhesive composition is also highly useful on securing sheets or plies or strips of metal directly to other surfaces, e. g., directly to wooden surfaces, for the purpose of producing light, strong and permanent structures and materials without any particular modification.

The composition is further useful for securing together into a suitable mass, animal and/or mineral fibers, by applying the composition to the fibers by any spraying, dipping, or coating operation and thereby binding them into a permanent relationship to form a bat, layer, felt, ply, or board of any desired shape, size or thickness.

Fibers of mineral wool and comminuted flakes of mica, formed into a sheet or ply, provide excellent non-conductors of heat and/or electricity and my invention is suitable for binding these fibers and flakes in the making of single or multiple sheet products. The fibers and/or flakes are permanently retained in these forms, and in making combined board of said materials, e. g., mica board, my composition is well adapted for uniting these plies or layers, particularly because of its water-resisting, high adhesive properties.

My composition is also eminently adapted for treating textile fabrics, in the production of water-resisting textile fabrics and for securing the piles of a plush, velvet, carpet or other pile fabric to the backing thereof and for impregnating and coating woven or felted fabrics of all descriptions, such, for instance, as those used in the making of gaskets, beltings and similar products, or for applying to the surfaces of textile a thin rubber-like water-resisting film.

The composition may also be used in the manufacture of paper or paper board by adding it, for instance, to the pulp in the beater or by applying it to the web or sheet before or after it is formed into a finished sheet, the sheet being either coated or impregnated with the composition depending upon the particular purpose to which the paper or board is to be used.

From the above, it will be apparent that my improved composition is preferably prepared with dry ingredients. Dry casein and dextrine are relatively light in weight, and the dry composition is more readily preserved over longer periods of time than after the same has been admixed with water to produce a mass having a glue, paste or paint consistency. It is not absolutely necessary, however, that the casein or carbohydrate be dry or granular. The oleo-resin dissolved in and cut back with a suitable solvent may be readily mixed into a mass of wet or moist casein without first drying and grinding the casein, and the lime or other alkali, and the soluble fluoride may be added thereto to produce satisfactory products having substantially the properties previously ascribed to my composition. The use, therefore, of the damp or moist casein is fully within the purview of this invention in the compounding of my novel product.

In order to facilitate or expedite the precipitation of the organic compound ingredient from the colloidal composition embodying my invention onto the surfaces to which the composition is applied and to impart hardness to the coating or surfacing, and particularly in the matter of sizing textile and other fibrous fabrics, or in the manufacture of paper, or board, or paper board I may add a hardening and/or precipitating agent in connection with the use of my invention. This hardening and/or precipitating agent may be added to the composition after the water has been added thereto and just prior to the time when it is to be applied or used, or the hardening agent may be applied to the goods after the colloidal composition has been spread or otherwise applied thereto or thereon.

The agents which may be so employed are numerous, but I find that small quantities of weak solutions of formaldehyde or of sodium acetate, or of sulphate of aluminum, or of alum, are useful for the purpose.

Having thus described my invention, what I claim and desire to protect by Letters Patent of the United States, is:

1. A composition of matter containing a protein, a water-soluble fluoride, lime, Canada balsam, and a solvent of said balsam.
2. A composition of matter containing a carbohydrate, a water-soluble fluoride, lime, Canada balsam, and a solvent of said balsam.
3. A composition of matter containing carbohydrate alkali, Canada balsam, and isopropyl alcohol.
4. A dry granular composition for the purposes indicated containing casein in dry granular form, the particles of which have been admixed with Canada balsam, a solvent of said balsam and a softener.
5. A dry granular composition for the purposes indicated containing casein in dry granular form, the particles of which have been admixed with Canada balsam and a solvent of said balsam.
6. A dry granular composition for the purposes indicated containing a protein in dry granular form, the particles of which have been admixed with a material selected from the group consisting of Canada balsam and the pitch of the Oregon fir tree, and a solvent of said material.
7. A composition of matter for the purposes indicated, containing normally dry granular casein, the particles of which are coated with Canada balsam admixed with a solvent of said balsam, and admixed with a softener and water sufficient to reduce the mass to at least a thick homogeneous plastic composition.
8. A dry, granular composition of matter capable of forming a colloidal solution in water and containing a protein and an oleo-resin, in the ratio of at least ¾ to 4 quarts of oleo-resin to every 100 pounds of protein, and a solvent for the oleo-resin.
9. The composition defined in claim 18, the protein being casein and the oleo-resin being Canada balsam.

MONE R. ISAACS.

---

CERTIFICATE OF CORRECTION.

Patent No. 2,160,869.    June 6, 1939.

MONE R. ISAACS.

It is hereby certified that error appears in the printed specification of the above numbered patent requiring correction as follows: Page 3, first column, line 61, for "pant" read paint; page 4, second column, line 38, claim 9, for the claim reference numeral "18" read 8; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.

tion is more readily preserved over longer periods of time than after the same has been admixed with water to produce a mass having a glue, paste or paint consistency. It is not absolutely necessary, however, that the casein or carbohydrate be dry or granular. The oleo-resin dissolved in and cut back with a suitable solvent may be readily mixed into a mass of wet or moist casein without first drying and grinding the casein, and the lime or other alkali, and the soluble fluoride may be added thereto to produce satisfactory products having substantially the properties previously ascribed to my composition. The use, therefore, of the damp or moist casein is fully within the purview of this invention in the compounding of my novel product.

In order to facilitate or expedite the precipitation of the organic compound ingredient from the colloidal composition embodying my invention onto the surfaces to which the composition is applied and to impart hardness to the coating or surfacing, and particularly in the matter of sizing textile and other fibrous fabrics, or in the manufacture of paper, or board, or paper board I may add a hardening and/or precipitating agent in connection with the use of my invention. This hardening and/or precipitating agent may be added to the composition after the water has been added thereto and just prior to the time when it is to be applied or used, or the hardening agent may be applied to the goods after the colloidal composition has been spread or otherwise applied thereto or thereon.

The agents which may be so employed are numerous, but I find that small quantities of weak solutions of formaldehyde or of sodium acetate, or of sulphate of aluminum, or of alum, are useful for the purpose.

Having thus described my invention, what I claim and desire to protect by Letters Patent of the United States, is:

1. A composition of matter containing a protein, a water-soluble fluoride, lime, Canada balsam, and a solvent of said balsam.

2. A composition of matter containing a carbohydrate, a water-soluble fluoride, lime, Canada balsam, and a solvent of said balsam.

3. A composition of matter containing carbohydrate alkali, Canada balsam, and isopropyl alcohol.

4. A dry granular composition for the purposes indicated containing casein in dry granular form, the particles of which have been admixed with Canada balsam, a solvent of said balsam and a softener.

5. A dry granular composition for the purposes indicated containing casein in dry granular form, the particles of which have been admixed with Canada balsam and a solvent of said balsam.

6. A dry granular composition for the purposes indicated containing a protein in dry granular form, the particles of which have been admixed with a material selected from the group consisting of Canada balsam and the pitch of the Oregon fir tree, and a solvent of said material.

7. A composition of matter for the purposes indicated, containing normally dry granular casein, the particles of which are coated with Canada balsam admixed with a solvent of said balsam, and admixed with a softener and water sufficient to reduce the mass to at least a thick homogeneous plastic composition.

8. A dry, granular composition of matter capable of forming a colloidal solution in water and containing a protein and an oleo-resin, in the ratio of at least ¾ to 4 quarts of oleo-resin to every 100 pounds of protein, and a solvent for the oleo-resin.

9. The composition defined in claim 18, the protein being casein and the oleo-resin being Canada balsam.

MONE R. ISAACS.

CERTIFICATE OF CORRECTION.

Patent No. 2,160,869.   June 6, 1939.

MONE R. ISAACS.

It is hereby certified that error appears in the printed specification of the above numbered patent requiring correction as follows: Page 3, first column, line 61, for "pant" read paint; page 4, second column, line 38, claim 9, for the claim reference numeral "18" read 8; and that the said Letters Patent should be read with this correction therein that the same may conform to the record of the case in the Patent Office Signed and sealed this 26th day of September, A. D. 1939.

(Seal)

Henry Van Arsdale,
Acting Commissioner of Patents.